UNITED STATES PATENT OFFICE.

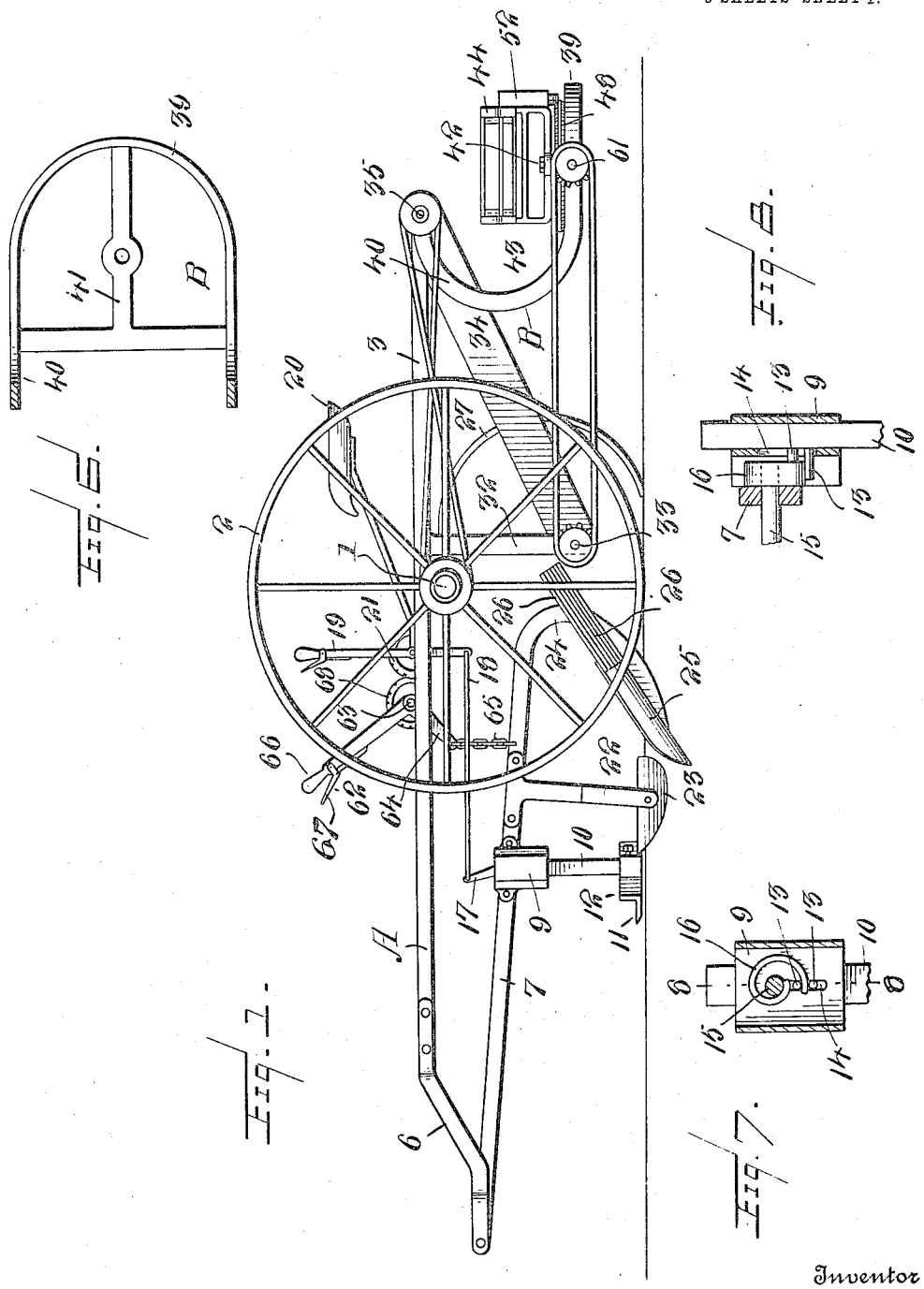

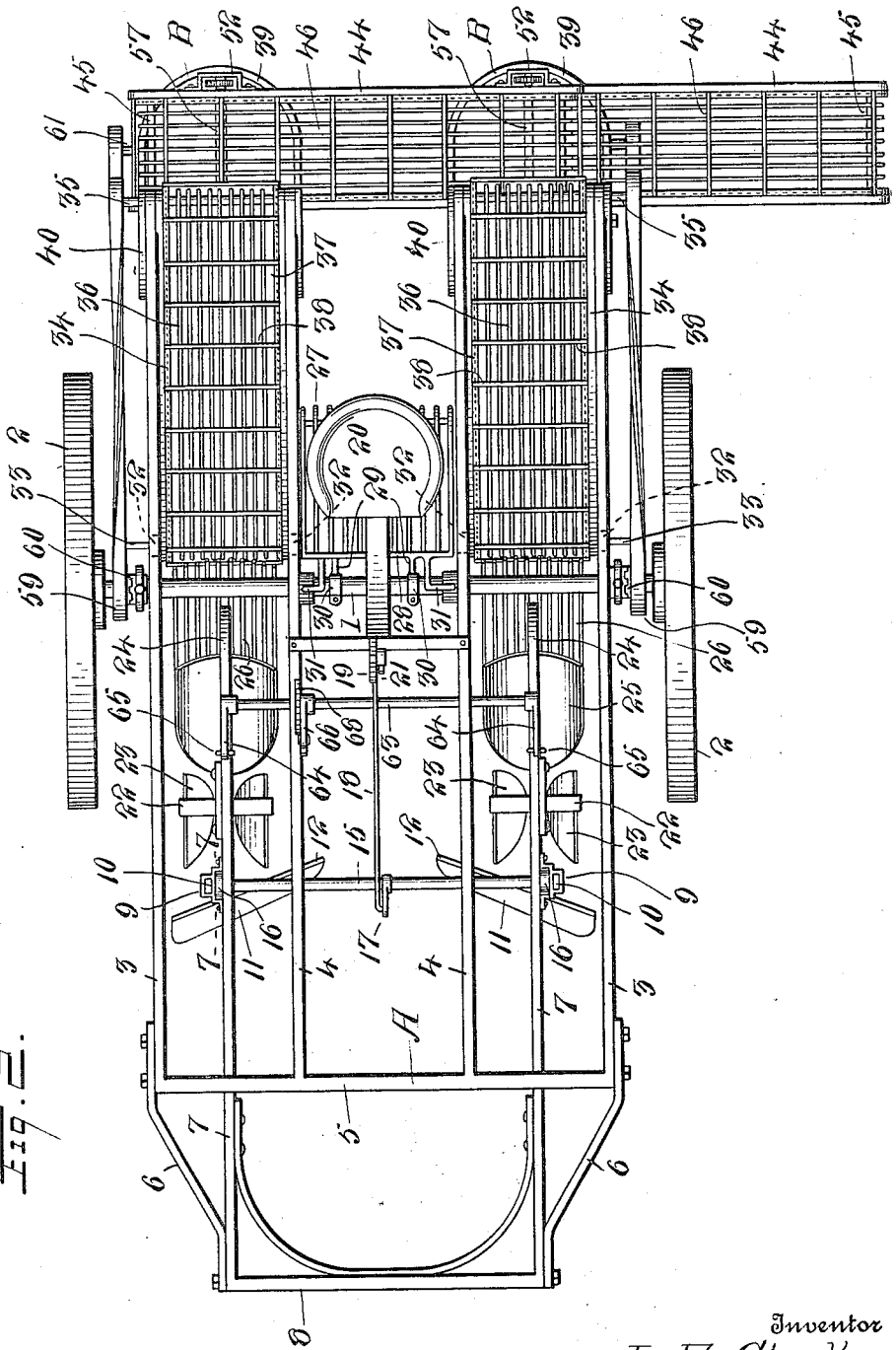

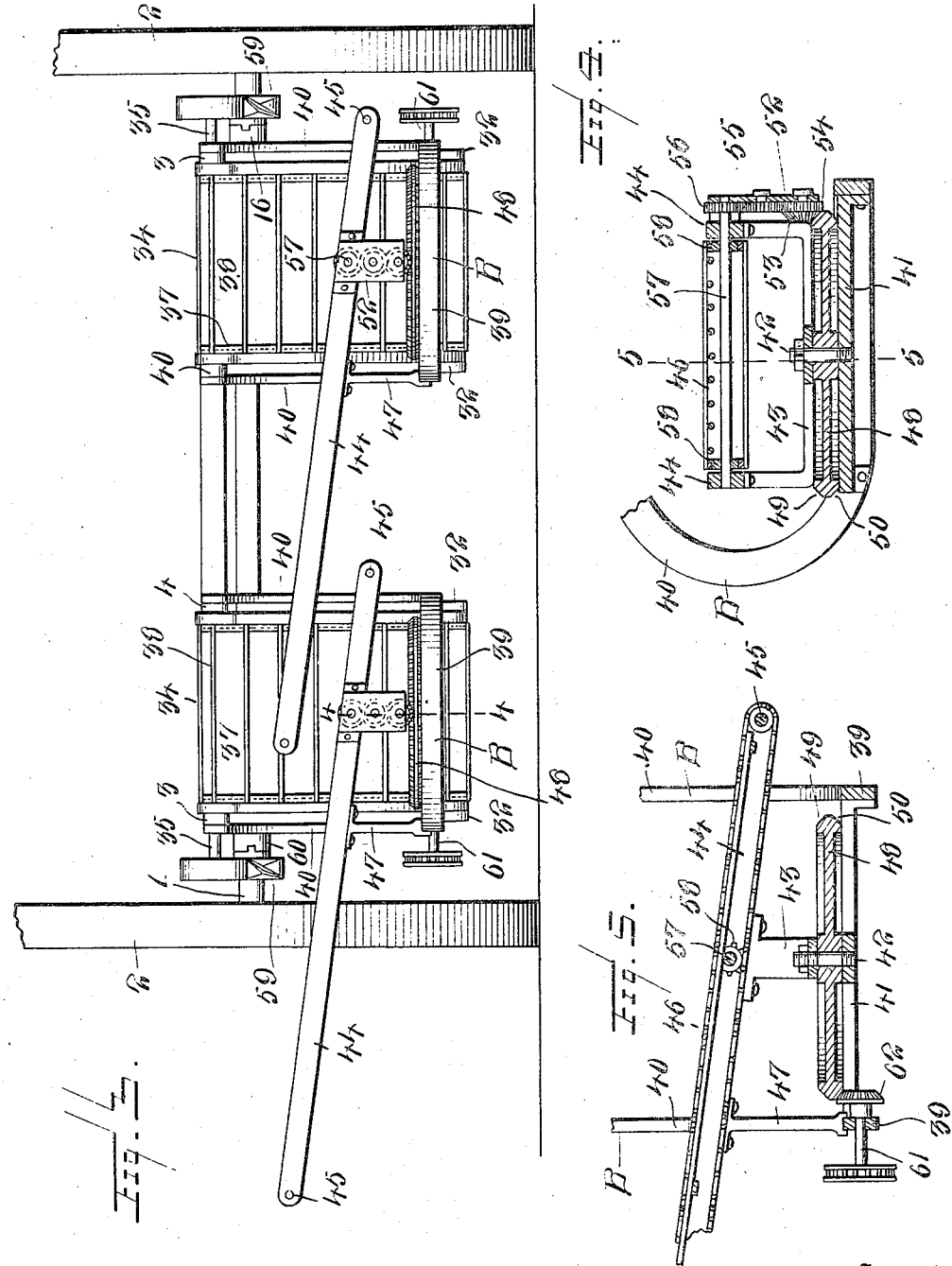

LEWIS E. STARKEY, OF DOUGLAS, NORTH DAKOTA.

BEET-HARVESTER.

1,127,537. Specification of Letters Patent. Patented Feb. 9, 1915.

Application filed November 12, 1912. Serial No. 730,944.

*To all whom it may concern:*

Be it known that I, LEWIS E. STARKEY, a citizen of the United States, residing at Douglas, in the county of Ward and State of North Dakota, have invented new and useful Improvements in Beet-Harvesters, of which the following is a specification.

This invention relates to beet harvesters, and the prime object of the invention is to produce a harvesting machine of simple and inexpensive construction that shall be capable of operating simultaneously on two rows of beets for the purpose of topping the same, lifting them from the ground and elevating them into a suitable receptacle such as the box of a wagon that may be driven alongside the harvesting machine.

A further object of the invention is to produce a two row harvester having topping knives which move the tops under the middle part of the harvester frame in the path of the centrally located rake, whereby the tops from two rows will be gathered into a single row of piles for subsequent use.

A further object of the invention is to produce simple and efficient means whereby the beets may be delivered to either side of the harvester frame, thus enabling the receiving wagon to travel on land from which the beets have been dug in which ever direction the harvesting machine may be traveling.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of a beet harvester constructed in accordance with the invention. Fig. 2 is a top plan view of the same. Fig. 3 is a rear elevation on an enlarged scale. Fig. 4 is a sectional view taken through the turn table of one of the carriers and related parts, on the line 4—4 in Fig. 3. Fig. 5 is a sectional view taken on the line 5—5 in Fig. 4. Fig. 6 is a plan view partly in section of the frame constituting the turn table of one of the carriers. Fig. 7 is a sectional detail view of the adjusting means for the topping knives taken on the line 7—7 in Fig. 2. Fig. 8 is a sectional view taken on the line 8—8 in Fig. 7.

Corresponding parts in the several figures are denoted by like characters of reference.

The main frame A of the improved machine is supported on a revoluble axle 1 having transporting wheels 2, 2, one or both of which are fixed on the axle to enable power to be taken therefrom for driving the moving parts of the machine. The main frame A comprises outer longitudinal beams or bars 3 and inner longitudinal bars 4, each pair of bars 3, 4 constituting the side bars of a sub-frame which supports means to be hereinafter described for operating on a single row of beets. The bars 3, 3 and 4, 4 are suitably connected together at their front ends by a cross bar 5, and the outer frame bars 3 are provided with forwardly extending brackets 6. It is to be understood that the framework of the machine may be constructed of wood, metal or other suitable material, and that wherever metal is used it may be in the form of angle bars or channel bars for the purpose of insuring the requisite strength and lightness.

Connected pivotally with the brackets 6 is the digger frame which consists of side beams 7 which are connected together at their front ends by a cross bar 8. Each of the side beams 7 carries a casing or housing 9 wherein a standard 10 is vertically adjustable, said standard carrying at its lower end a topping knife 11 for the purpose of removing the tops of the beets. Each topping knife is provided at its rear edge with an upstanding flange 12, and the topping knives associated with the two standards 10 are placed obliquely so as to converge rearwardly in the direction of the longitudinal medial line of the main frame, as clearly seen in Fig. 2. It follows that the tops removed from the beets by these knives will, as the machine progresses, be pushed or moved in the direction of the medial line between the two rows of beets where they will be left upon the ground in the path of a gathering device which will be presently described.

Each of the standards 10 is provided with fingers 13 projecting through a slot 14 in the casing or housing 9. The two casings or housings afford bearings for a rock shaft 15 carrying spiral cams 16 that operate between the fingers 13 so that by rocking the shaft 15, the standards carrying the topping knives will be raised or lowered, according to the direction in which the rock shaft is oscillated. For the purpose of actuating the rock shaft 15, it is provided with an arm 17 which is connected by a link 18 with a hand lever 19 which is suitably mounted in convenient proximity to the operator for whom a seat 20 is provided. The lever 19 and the parts actuated thereby may be retained at various adjustments by means of a stop member of well known construction engaging a segment rack 21.

Each of the beams 7 carries a bifurcated standard 22 equipped with lifting blades 23, whereby the beets are pushed or lifted from the ground, and each of the beams is also curved downwardly at its rear end to present a standard 24 carrying an inclined digger blade 25, the rear edge of which is provided with upwardly extending spaced rods 26 over which the beets will be pushed or guided on to the carriers to be presently described.

A gathering device is provided consisting of a rake comprising a plurality of curved teeth 27 connected with a cross bar or head 28 having forwardly extending arms 29 provided with terminal rings or clips 30 that are pivoted on the axle 1. The rake head 28 is also provided with treadles 31 enabling the rake to be tilted by the feet of the operator. The rake is positioned intermediate the longitudinal frame bars 4, 4 so as to travel between the rows of beets that are being operated upon for the purpose of gathering the tops which may thus be deposited in piles at suitable intervals to enable them to be conveniently gathered.

The main frame of the machine is provided with downwardly extending arms or brackets 32, said arms extending downwardly from each of the bars 3, 3 and 4, 4, as indicated in dotted lines in Fig. 2. The arms 32 depending from each pair of frame bars 3 and 4 afford bearings for a shaft 33 supporting the lower end of an inclined carrier 34, the upper end of which is supported on a shaft 35 journaled at the rear ends of the frame bars 3, 4. The carrier frame 34 supports longitudinal screen bars 36, and an endless carrier 37 is guided over the shafts 33, 35 which are provided with toothed wheels or sprockets to support said carrier. Each carrier 37 is provided with cleats or flights 38 extending across the screen bars 36 for the purpose of conveying the beets that are deposited on the carrier in an upward direction over the screen bars which permit loose dirt to drop upon the ground while the beets are discharged over the elevated rear ends of the carriers 37.

Each pair of frame bars 3, 4 supports a bracket B comprising a semi-circular or U-shaped track portion 39 and upwardly extending curved arms 40 which are terminally connected with the rear ends of the frame bars 3, 4. The U-shaped portion of each bracket B is reinforced by a T-brace 41 having a bearing for an axial bolt 42 on which is pivoted a U-shaped frame 43 supporting a carrier frame 44 provided at the ends thereof with shafts 45 from which a suitably supported endless carrier 46 is guided. Each of the carrier frames 44 is provided with a bracket 47 supporting and riding on the track portion 39 of one of the brackets B, and serving to maintain the carrier frame in a tilted or inclined position, as shown. Each of the axial bolts 42 supports an approximately horizontal wheel 48, said wheel being a double bevel gear having upper and lower beveled and toothed faces 49, 50, as best seen in Figs. 4 and 5. Motion is transmitted from the upper bevel face of each wheel 48 to one of the carriers 46 by means of a train of gears housed in a casing 52 adjacent to the U-shaped bracket 43, and including a bevel pinion 53 and intermeshing spur wheels 54, 55 and 56, the latter being mounted on a shaft 57 journaled transversely in the carrier frame 44 and having sprocket wheels 58 that engage the chains which constitute the flexible elements of the endless carrier.

The axle 1 is provided with transmission wheels 59 which are normally loose on the axle, but which may be connected operatively therewith by means of clutches 60 of well known construction. Motion is transmitted from each wheel 59 to the shaft 35 at the upper rear end of one of the carriers 37. Motion is likewise transmitted from the shaft 33 at the lower front end of each carrier 37 to a shaft 61 having a bevel pinion 62 meshing with the lower bevel face 50 of one of the wheels 48.

The carrier frames 44 are normally disposed transversely of the machine approximately at right angles to the carrier frames 34, and one of the frames 44 will overlap the lower end of the other frame 44, as will be very clearly seen in Fig. 3 of the drawings. As seen in this view, material deposited on the carriers mounted in the frames 44 by the carriers mounted in the frames 34 will be delivered to the left side of the machine. The carrier frames 44, however, may be swung or moved about the axes of the bolts 42 from the left to the right side of the frame, when the frame which was previously overlapped will obviously overlap its mate, thus delivering material at the right side of the machine. This change or movement of the carrier frames from one side of the machine to the other may be very easily and quickly effected, since the supporting brackets 47 will ride over the curved portions 39 of the brackets B, as upon turn tables, until the desired adjustment has been made. Means may obviously be used for securing the parts at the desired adjustment, although it has not been deemed necessary to illustrate such means.

For the purpose of moving the earth engaging elements carried by the digger frame into or out of operation a rock shaft is provided, as shown at 63, having arms 64 which are connected with the beams 7 by flexible elements, such as chains 55. The rock shaft 63 is actuated by a hand lever 66 having a suitable stop member operable by a handle 67 and adapted to engage a segment rack 68 for the purpose of securing the hand lever and related parts in adjusted position.

From the foregoing description, taken in connection with the drawings hereto annexed, the operation and advantages of this invention will be readily understood by those skilled in the art to which it appertains.

It will be seen that I have produced a very simple and inexpensive machine for operating on two rows of beets which by the action of the machine will be topped and lifted from the ground, the tops being moved into the path of the gathering rake, whereby they are gathered into piles to be subsequently utilized as feed or for other purposes, while the beets are elevated and discharged adjacent to either side of the machine.

Having thus described the invention, what is claimed as new, is:—

1. A two row beet harvester comprising a main frame, a digger frame pivotally connected therewith and having two rearwardly extending beams, topping knives, lifting blades and inclined diggers carried by said beams, and means whereby said beams may be adjusted, said topping knives being obliquely disposed to converge rearwardly and provided with upstanding flanges at their rear edges; and a rake supported on the main frame intermediate the beams of the digger frame to gather the tops pushed into the path of said rake by the converging topping knives.

2. In a beet harvester, a main frame having two pairs of longitudinal frame bars, each pair constituting a subframe, a rake supported between the sub-frames, and digger beams supported between the frame bars of each sub-frame, said beams equipped with topping knives and lifting and digging members.

3. In a beet harvester, a main frame having two pairs of longitudinal frame bars, each pair constituting a sub-frame, a rake supported between the sub-frames, and topping, digging and lifting means connected with each sub-frame, said topping means comprising substantially horizontal blades disposed obliquely and inclining rearwardly in the direction of the space between the sub-frames, each cutting blade being provided with an upstanding flange at its rear edge.

4. In a beet harvester, a main frame having parallel bars forming a sub-frame, a pivotally supported beam extending rearwardly between the bars of the sub-frame, and topping, digging and lifting means carried by said beam, said topping means including a housing mounted on the beam and having a vertical slot, a standard movable vertically in the housing and carrying a topping knife, said standard being provided with fingers extending through the slot of the housing, a rock shaft having a spiral cam engaging between the fingers, and means for actuating the rock shaft.

In testimony whereof I affix my signature in presence of two witnesses.

LEWIS E. STARKEY.

Witnesses:
 L. F. SANGER,
 O. ERB.